(12) United States Patent
Hahn

(10) Patent No.: US 12,082,684 B2
(45) Date of Patent: Sep. 10, 2024

(54) LANYARD

(71) Applicant: Black & Decker Inc., New Britain, CT (US)

(72) Inventor: Norbert Hahn, Hunstetten-Limbach (DE)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/452,479

(22) Filed: Oct. 27, 2021

(65) Prior Publication Data

US 2022/0133020 A1 May 5, 2022

(30) Foreign Application Priority Data

Oct. 29, 2020 (GB) ...................................... 2017142
Dec. 2, 2020 (GB) ...................................... 2018990
Jul. 2, 2021 (GB) ...................................... 2109571

(51) Int. Cl.
| | | |
|---|---|---|
| A44B 11/25 | (2006.01) | |
| A45F 5/00 | (2006.01) | |
| A45F 5/02 | (2006.01) | |
| B23B 45/00 | (2006.01) | |
| B25F 5/00 | (2006.01) | |
| B25H 3/00 | (2006.01) | |
| B25D 17/20 | (2006.01) | |
| B25D 17/28 | (2006.01) | |

(52) U.S. Cl.
CPC ............... *A45F 5/021* (2013.01); *A45F 5/00* (2013.01); *B23B 45/003* (2013.01); *B25F 5/00* (2013.01); *B25H 3/00* (2013.01); *A45F 2005/006* (2013.01); *A45F 2200/0575* (2013.01); *B25D 17/20* (2013.01); *B25D 17/28* (2013.01)

(58) Field of Classification Search
CPC ............... A45F 2005/006; A45F 5/021; A45F 2200/0575; Y10T 24/4086; Y10T 24/4019; Y10T 24/2708; Y10T 24/1391; Y10T 24/314; Y10T 24/316; Y10T 24/1397; B25H 3/00; B25H 3/006; A44B 11/25; A44B 11/18
USPC ......................... 224/254, 220, 677; 24/3.13
See application file for complete search history.

(56) References Cited

U.S. PATENT DOCUMENTS

| | | |
|---|---|---|
| D139,568 S | 9/1944 | Hinchman |
| 2,807,852 A | 10/1957 | Jean |
| 2,809,408 A | 10/1957 | Goldstein |
| 2,983,015 A | 5/1961 | Bernard |

(Continued)

FOREIGN PATENT DOCUMENTS

| | | |
|---|---|---|
| CA | 2509084 | 12/2006 |
| EP | 3517254 A1 | 7/2019 |

(Continued)

OTHER PUBLICATIONS

GB Search Report Sec 17, dated Jan. 4, 2022 in corresponding GB Application 2019571.6.

(Continued)

*Primary Examiner* — Adam J Waggenspack
(74) *Attorney, Agent, or Firm* — Amir R. Rohani

(57) ABSTRACT

A lanyard for a power tool includes at least two belts including a first belt and a second belt attached to each other at a single junction. The lanyard may also include an accessory mounted on the belt that is freely rotatable around the belt.

14 Claims, 15 Drawing Sheets

(56) References Cited

U.S. PATENT DOCUMENTS

| | | | |
|---|---|---|---|
| 3,908,875 A * | 9/1975 | Wilson | A45C 1/04 |
| | | | 2/338 |
| 4,005,506 A | 2/1977 | Moore | |
| 4,558,495 A | 12/1985 | Olsen | |
| 4,678,059 A | 7/1987 | Bowker | |
| 4,777,703 A | 10/1988 | Knox | |
| 4,848,980 A * | 7/1989 | Broussard | B23Q 11/0053 |
| | | | 408/72 R |
| 4,918,790 A | 4/1990 | Cirket et al. | |
| 5,172,455 A | 12/1992 | Johnson | |
| 5,332,071 A | 7/1994 | Duncan | |
| 5,816,458 A | 10/1998 | Yonenoi | |
| D430,005 S | 8/2000 | Stearns | |
| 6,095,282 A | 8/2000 | Sadeck | |
| 6,185,797 B1 | 2/2001 | Lan | |
| D458,533 S | 6/2002 | Sonju | |
| 6,543,097 B2 | 4/2003 | Burt et al. | |
| 6,626,132 B1 * | 9/2003 | Mann | A01K 27/003 |
| | | | 119/769 |
| 6,776,317 B1 | 8/2004 | Parker | |
| 6,835,032 B1 | 12/2004 | Pozgay et al. | |
| 6,868,586 B1 | 3/2005 | Hall | |
| 6,940,033 B1 | 9/2005 | Jones, Jr. et al. | |
| 7,093,329 B1 | 8/2006 | Chiu | |
| 7,458,135 B2 | 12/2008 | Mikesell et al. | |
| 7,629,766 B2 | 12/2009 | Sadow | |
| D618,536 S | 6/2010 | Eason | |
| 7,819,787 B2 | 10/2010 | Kassel | |
| 8,011,541 B2 * | 9/2011 | Mikesell | B25H 3/006 |
| | | | 224/904 |
| 8,056,191 B2 | 11/2011 | Crye et al. | |
| D675,084 S | 1/2013 | Moreau et al. | |
| D676,311 S | 2/2013 | Moreau et al. | |
| 8,403,132 B2 | 3/2013 | Moreau et al. | |
| D679,577 S | 4/2013 | Moreau et al. | |
| D684,845 S | 6/2013 | Wood | |
| 8,567,290 B2 | 10/2013 | Moreau et al. | |
| 8,646,768 B2 | 2/2014 | Kish et al. | |
| D706,123 S | 6/2014 | Mathews et al. | |
| D710,186 S | 8/2014 | Earley | |
| D713,240 S | 9/2014 | Chance et al. | |
| D718,117 S | 11/2014 | Moreau et al. | |
| 8,898,870 B2 | 12/2014 | Chan | |
| 8,919,629 B2 | 12/2014 | Moreau et al. | |
| D721,010 S | 1/2015 | Spater | |
| 8,997,317 B2 | 4/2015 | Rinklake | |
| 9,155,376 B2 * | 10/2015 | Moreau | B25H 3/00 |
| 9,232,850 B2 | 1/2016 | Moreau et al. | |
| 9,339,100 B2 | 5/2016 | Moreau et al. | |
| 9,402,457 B2 | 8/2016 | Moreau et al. | |
| D775,517 S | 1/2017 | Votel et al. | |
| 9,587,908 B2 * | 3/2017 | Bjelde | F41C 33/007 |
| D789,188 S | 6/2017 | Votel et al. | |
| 9,791,102 B2 | 10/2017 | Moreau et al. | |
| 9,801,457 B2 | 10/2017 | Moreau et al. | |
| 9,833,893 B2 | 12/2017 | Moreau et al. | |
| 10,045,606 B2 * | 8/2018 | Cirincione, II | B25F 5/02 |
| 10,136,722 B1 | 11/2018 | Cirincione et al. | |
| 10,383,429 B2 * | 8/2019 | Moreau | B25H 3/00 |
| 10,717,206 B2 * | 7/2020 | Weinig | H01R 13/635 |
| 10,820,666 B1 | 11/2020 | Lin | |
| 11,504,840 B2 * | 11/2022 | Rudolph | H01M 50/529 |
| 11,730,985 B2 * | 8/2023 | Fjelldal | F16F 1/125 |
| | | | 248/560 |
| 2003/0102342 A1 | 6/2003 | Fogg | |
| 2004/0200436 A1 | 10/2004 | Staack | |
| 2006/0149517 A1 * | 7/2006 | El-Sayed | G06F 30/23 |
| | | | 703/7 |
| 2006/0237498 A1 * | 10/2006 | Piatt, Sr. | A45F 5/02 |
| | | | 224/904 |
| 2007/0114141 A1 | 5/2007 | Mikesell | |
| 2007/0226964 A1 | 10/2007 | Woods | |
| 2008/0054062 A1 | 3/2008 | Gunning et al. | |
| 2008/0163464 A1 * | 7/2008 | Baumann | A45F 5/02 |
| | | | 24/3.12 |
| 2008/0185414 A1 * | 8/2008 | Conlon | A45F 5/02 |
| | | | 206/349 |
| 2010/0147912 A1 * | 6/2010 | Salentine | A45F 5/02 |
| | | | 224/254 |
| 2012/0168472 A1 | 7/2012 | Matthews | |
| 2012/0247994 A1 | 10/2012 | Moreau et al. | |
| 2012/0267403 A1 | 10/2012 | Ward, Jr. | |
| 2013/0062498 A1 | 3/2013 | Ito et al. | |
| 2014/0013544 A1 | 1/2014 | Moreau | |
| 2014/0196262 A1 | 7/2014 | Chan | |
| 2015/0202470 A1 | 7/2015 | He | |
| 2015/0289633 A1 | 10/2015 | Moreau et al. | |
| 2016/0067862 A1 | 3/2016 | Moreau | |
| 2016/0199678 A1 | 7/2016 | Tsai et al. | |
| 2016/0227911 A1 | 8/2016 | Bezakin | |
| 2016/0257065 A1 | 9/2016 | Moreau et al. | |
| 2016/0375575 A1 | 12/2016 | Moreau et al. | |
| 2017/0119137 A1 | 5/2017 | Cirincione et al. | |
| 2018/0132600 A1 | 5/2018 | Moreau | |
| 2019/0374013 A1 | 12/2019 | Flores | |
| 2020/0223024 A1 | 7/2020 | Peterson et al. | |

FOREIGN PATENT DOCUMENTS

| | | |
|---|---|---|
| GB | 2030210 A | 4/1980 |
| GB | 2493333 A | 2/2013 |
| GB | 2500666 | 10/2013 |
| GB | 2581438 A | 8/2020 |
| JP | 2001170878 | 6/2001 |

OTHER PUBLICATIONS

GB Search Report Sec 17, dated Jan. 6, 2022 in corresponding GB Application 2019571.6.

Partial ESR mailed Sep. 19, 2023 in corresponding EP Application No. 23170246.5, 11 pages.

* cited by examiner

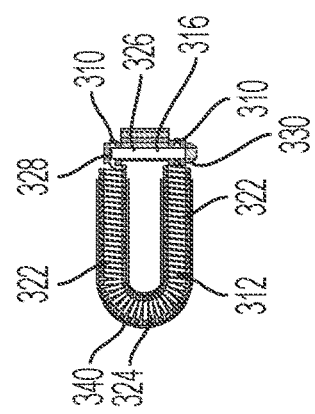
FIG. 10B
FIG. 10C
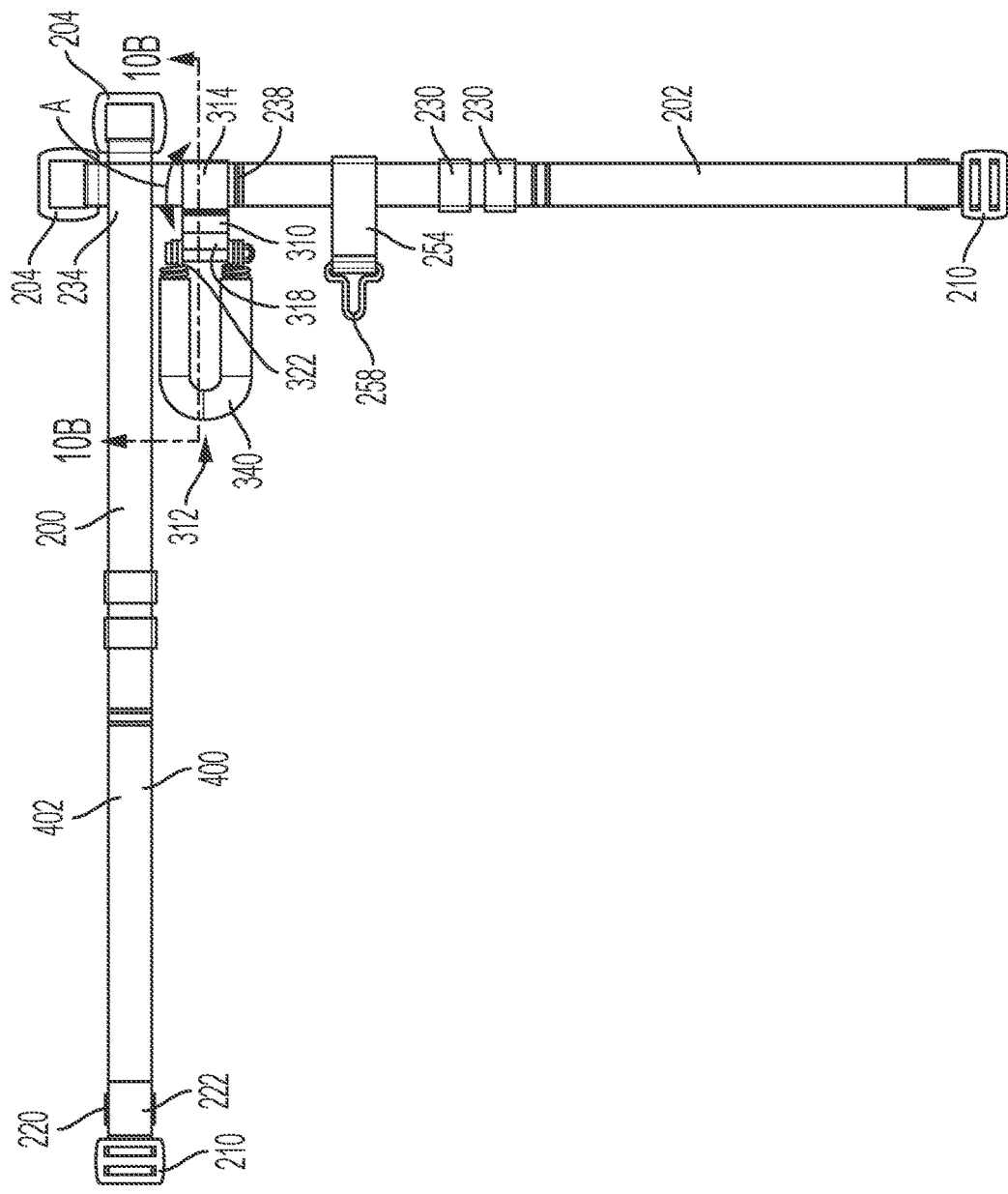
FIG. 10A

LANYARD

CROSS-REFERENCE TO RELATED APPLICATIONS

This application claims priority, under 35 U.S.C. § 119, to UK Patent Application No. 2017142.7 filed Oct. 29, 2020, UK Patent Application No. 2018990.8 filed Dec. 2, 2020, and UK Patent Application No. 2109571.6 filed Jul. 2, 20201, all of which are incorporated herein by reference in their entireties.

FIELD

The present invention relates to a lanyard for use with a power tool, for example with a hammer drill.

BACKGROUND

Tradespeople, who work on construction sites, use power tools to make or repair buildings and/or infrastructure on the construction site. Certain types of power tools, referred to as a portable power tools, are supported and manoeuvred by the user whilst being used to perform their function. Such power tools include portable hammer drills, portable sanders, portable electric drill/drivers, portable routers, and portable reciprocating, jig and circular saws. Often, the user has to support the portable power tool in an awkward position and/or at a difficult orientation whilst using the portable power tool. This occasionally results in the user dropping the portable power tool. Often the user can be using the portable power tool at a significant height above the ground. If the user drops the portable power tool whilst working at a significant height, the portable power tool would drop a substantial distance which is likely to result in damage to the power tool. This is undesirable as it prevents the user from continuing with completing the manufacture or repair of the building or infrastructure until a replacement tool is found. Portable power tools are also expensive to replace. Furthermore, if another person was working below the user, dropping a portable power tool could result in the tool striking that person resulting in injury. It is therefore desirable to prevent the portable power tool from falling a significant distance if dropped by the user.

A lanyard is a cord or strap which attaches an item to a person or a structure. For example, lanyards are often used on identity cards to attach the identity card to a person. Lanyards can be used to attach portable power tools to either the user operating the portable tool or the building or infrastructure being worked on to prevent the portable power tool from falling a significant distance if dropped by the user. The general concept of using lanyards to attach portable power tools to the user or a structure is known.

SUMMARY

According to an embodiment, a lanyard for a power tool is provided comprising at least two belts including a first belt and a second belt attached to each other at a single junction.

In an embodiment, a first end of the first belt is attached to a first end of the second belt.

In an embodiment, when the at least two belts are extended in a straight direction, a plane of the first belt is parallel to a plane of the second belt.

In an embodiment, when the at least two belts are extended in a straight direction, the first belt extends in a direction that is perpendicular to the second belt.

In an embodiment, a first part of the first belt is capable of being attached to a second part of the first belt and/or a first part of the second belt is capable of being attached to a second part of the second belt.

In an embodiment, the first part of the first belt is attachable to the second part of the first belt using a first connector and the first part of the second belt is attachable to the second part of the second belt using a second connector.

According to an embodiment, a lanyard for a power tool is provided comprising a belt; and an accessory mounted on the belt, wherein the accessory is freely rotatable around the belt.

In an embodiment, the accessory is axially slidable along the belt.

In an embodiment, the accessory comprises a hook strap for a battery.

In an embodiment, the accessory comprises a T-shaped hook connected to the belt via the hook strap.

In an embodiment, the accessory comprises a spring strap for connecting to a building or infrastructure.

In an embodiment, the accessory comprises a carabiner, and the spring strap connects to the building or infrastructure via the carabiner.

In an embodiment, the accessory comprises a lanyard rope, and the spring strap connects to the building or infrastructure via the lanyard rope.

In an embodiment, the accessory comprises a spring, and the spring strap connects to the building or infrastructure via the spring. In an embodiment, the spring is at least one of a U-shaped spring, a linear spring, or a helical spring.

In an embodiment, a cross-sectional size or a diameter of the spring provides a visual indicator of a weight of an item which can be supported by the spring.

In an embodiment, the cross-sectional size or the diameter of the spring limits a size or type of a carabiner that can be used with the spring.

BRIEF DESCRIPTION OF THE DRAWINGS

The drawings described herein are for illustrative purposes only of selected embodiments and not all possible implementations and are not intended to limit the scope of the present disclosure.

FIG. 10A shows a third embodiment of the present invention;

FIG. 10B shows a cross-section in the direction of Arrows A-A of FIG. 10A;

FIG. 10C shows a cross-section in the direction of Arrows E-E in FIG. 10B;

DETAILED DESCRIPTION

Figure 1A:
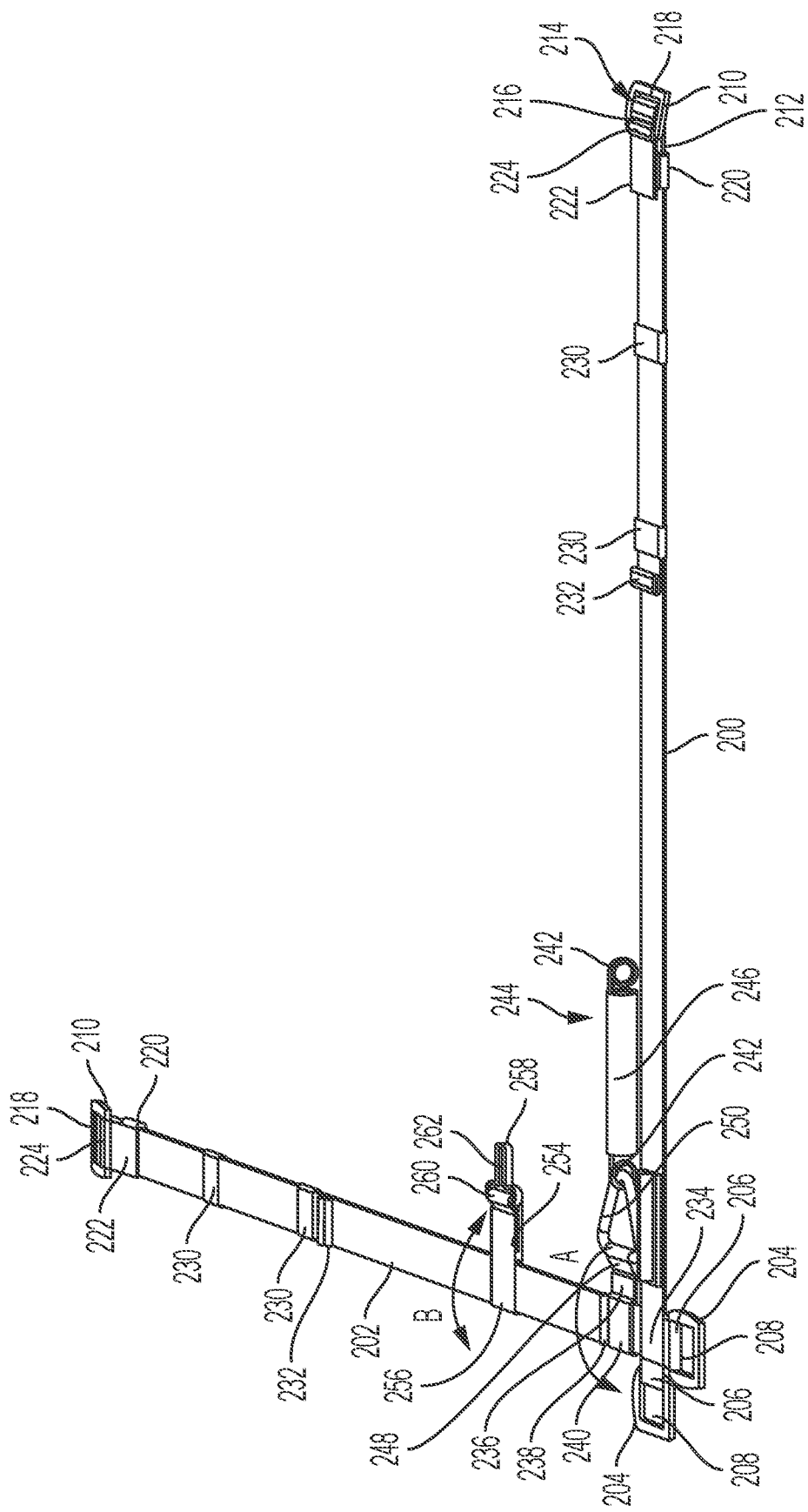
FIG. 1A shows a perspective view of a first embodiment of a lanyard according to the present invention.

Modern portable power tools often comprise a plurality of auxiliary parts which are releasably connected to the power tool or to each other. For example, FIG. 2A shows a hammer drill as it would be used by a user. The hammer drill 100 comprises a main body 102 having a tool holder 103 mounted at one end and a rear handle 104 mounted on the other. Mounted inside of the main body is a motor (not shown) and a hammer mechanism (not shown) which drives the tool holder 102. Releasably connected to the base of the handle 104 in a functional manner is a battery 106 which is an auxiliary part of the hammer drill 100. When the battery 106 is functionally connected to the base of the handle 104, it is both in mechanical and electrical connection to the hammer drill 100 so that it is physically supported by the hammer drill 100 and that electricity can pass from the battery 106 to the motor in order to power the motor when the hammer drill 100 is activated. Releasably connected in a functional manner to the underside of the main body 102 is a dust extractor 108 which forms a second auxiliary part to the hammer drill 100. The dust extractor 108 comprises a main housing 110, a telescopic arm 112 and a dust collection box 114. The dust collection box 114 is releasably connectable in a functional manner to the main housing 110. When the dust extractor 108 is functionally connected to the hammer drill 100, it is physically supported by the hammer drill. It is also capable of performing its intended function of removing dust and debris by suction, created by the action of the hammer drill 100 on a work piece, from a region on the work piece where it is being created, when the hammer drill 100 is activated and utilised. When the dust collection box 114 is functionally connected to the dust extractor 108, it physically support on the housing 110 of the dust extractor 108 and stores the dust and debris being removed by the dust extractor 108 from the region of the work piece which is being worked on by the hammer drill 100. It is therefore desirable not only to prevent the portable power tool, such as the hammer drill in FIG. 2A, from falling a significant distance if dropped by the user, but also all to prevent some or the additional releasably attachable auxiliary parts, such as the battery 106, the dust extractor 108 and dust collection box 114 from falling if they become detached from the hammer drill or dust extractor 108. Furthermore, it is more desirable to maintain the auxiliary parts connected in a functional manner to the power tool or other auxiliary parts if the power tool is dropped. This prevents physical damage to physical connectors between the auxiliary parts and the power tool as it avoids them being forcefully separated and electrical damage to them when a power supply, such as battery, is abruptly electrically disconnected. It also enables the power tool to be immediately used after it has been recovered from the fall as all of the auxiliary parts remain functionally connected.

The present invention provides an improved design of lanyard.

Whilst the embodiments described below relate to a portable hammer drill, it will be appreciated that the invention covers other types of portable tools such as portable sanders, electric drill/drivers, and portable routers, portable reciprocating, jig and circular saws, a portable angle, straight or die grinder, a portable fastener, a portable stapler, a portable nailer, a portable impact wrench, a portable jointer, a portable planer, a portable calk, eat or grease gun and portable powered gardening equipment such as hedge trimmers, string trimmers and blowers.

Four embodiments will now be described with reference to figures.

A first embodiment of a lanyard according to the present invention will now be described with reference to FIGS. 1A to FIG. 6.

Referring to FIGS. 1A to 6, the first embodiment of lanyard comprises two belts 200, 202 which are attached to each other.

Each belt is made from a material comprising polymers made from polyethersulfone (PES) with rubber incorporated into it.

A first metal rectangular loop 204 is attached to a first end 206 of the first belt 200 by the first end passing through the aperture 208 formed by the first metal loop 204 and then folding back on itself to lie against a part of the belt 200 adjacent the first end 206. The first end 206 is then attached to the part of the belt 200 adjacent the first end 206 by being stitched in well-known manner. It will be appreciated that the first end 206 can be attached to the part of the belt 200 adjacent the first end 206 by other methods, such as, gluing, welding or fusing, and/or rivets.

A first metal rectangular friction buckle 210 is attached to a second end 212 of the first belt 200. The first metal friction buckle 210 comprises a rectangular loop with a cross bar 214 attached between the centres of one pair of parallel sides and which extends parallel to the other pair of parallel sides in well know manner. Two buckle apertures 216, 218 are formed by the rectangular loop and the cross bar 214. The second end 212 of the first belt 200 is attached to the friction buckle 210 by passing the second end 212 through the second buckle aperture 218, then wrapping it around the cross bar 214, then passing it through the first buckle aperture 216 and then folding it back on itself to lie against a part of the belt 200 adjacent the second end 212. A first belt loop 220 made of elastic material surrounds the first belt 200 in close proximity of the second end 212. The second end 212, when folded back on itself to lie against a part of the belt 200 adjacent the second end 212, passes through the first belt loop 220, the first belt loop 220 maintaining the second end 212 in a folded position against the part of the belt 200 adjacent the second end 212. The belt loop 220 is capable of being slid along the length of the first belt 200 to different axial positions.

The length of the first belt 200 between the metal loop 204 and the first friction buckle 210 can be adjusted by adjusting the amount of the second end 212 of the first belt which passes through the first friction buckle 210 locates against the part of the belt 200 adjacent the second end 212. The position of the first belt loop 220 along the first belt 200 is adjusted to accommodate the length of the amounted of the first belt 200 which passes through the friction buckle 210 and is folded back against the first belt 200.

A first lock strap 222 is attached to one of the sides of the rectangular loop of the first metal friction buckle 210 which is parallel to cross bar 214. The first lock strap 222 is attached by a first end 224 passing through the first buckle aperture 216 formed by the metal loop and the cross bar 214 and then folding back on itself to lie against a part of the lock strap 222 adjacent the first end 206. The first end 224 is then attached to the part of the lock strap 222 adjacent the first end 224 by being stitched in well-known manner. It will be appreciated that the first end 224 can be attached to the part of the lock strap 222 adjacent the first end 224 by other methods, such as, gluing, welding or fusing, and/or rivets.

The first lock strap 222 is capable of being attached to the first belt loop 220 by a VELCRO© fastener. The VELCRO © fastener comprise two patches of material 226, 228. The first patch 226 comprises hooks of the VELCRO© fastener and is attached to the first belt loop 220 on a top side. The second patch 228 comprises hoops of the VELCRO© fastener and is attached to the free end 212 of the first lock strap 222 on a side of the lock strap 222 which faces the belt loop 220 when aligned with the belt loop 220. Once the length of the first belt 200 has been adjusted to the correct length, the first belt loop 220 is moved to a position where it can be engaged by the free end of the lock strap 222. The first and second patches 226, 228 are then engaged with each other to attach the free end of the lock strap 222 to the first belt loop 220.

The first friction buckle 210, when the second end 212 end of the first belt 200 is attached to the first friction buckle 210, can be attached to the first metal loop 204. The first friction buckle 210 is orientated so that the plane of the first friction buckle 210 is perpendicular to the plane of the first metal loop 204. The first friction buckle 210 is then placed in a position where one of the sides parallel to the cross bar 214 is adjacent a first side of the aperture 208 of the first metal loop 204 and then rotated so that the plane of the first friction buckle 210 aligns with two opposite corners of the first metal loop 204. The first friction buckle is then passed through the aperture 208 so that it locates on a second side of the aperture 208. The first friction buckle 210 is then rotated so that the plane of the first friction buckle 210 is parallel to the plane of the first metal loop 204. The first buckle is the moved so that it lies against the first metal loop 204 with the second end 212 trapped between the first friction buckle 210 and the first metal loop 204. The first belt 200 is then tightened to the appropriate length by pulling the second end 212 of the first belt further through the friction buckle 210. When the first belt 200 is wrapped around an object, the first friction buckle 210 lies against the first metal loop 204 which in turn lies against the object. When the first belt 200 is tightened, the first friction buckle 210 presses against the first metal loop 204 which in turn presses against the object. This results in the first friction buckle 210 frictionally engaging the second end 212 of the first belt 200 as it is compressed between the first metal loop 204 and the first friction buckle 210.

The friction first buckle 210, when the second end 212 end of the first belt attached to the first friction buckle 210, can then be locked to the first metal loop 204 by attaching the first lock strap 222 to the first belt loop 220 by the VELCRO© fastener in order maintain the plane of the first friction buckle 210 parallel to the plane of the first metal loop 204 and prevent relative rotation between the two to maintain the frictional contact.

The friction first buckle 210 can be detached from the first metal loop 204 by detaching the VELCRO fastener 226, 228 to release the first lock strap 222 from the first belt loop 220, slackening the first belt 200 by pulling the second end 212 of the first belt through the friction buckle 210 in the opposite direction so that less of the second end 212 passes through the friction buckle 210, then detaching the first metal loop 204 from the first friction buckle 210 by passing the first friction buckle 210 in reverse direction through the aperture 208 in the first metal loop 204.

Two further belt loops 230 made from elastic material are mounted on and capable of being slid along the first belt 200. The two belt loops 230 are capable of sliding to positions adjacent each other and the first belt loop 220. A non-moveable stop 232 is mounted on the first belt 200 to limit the movement of the belt loops 220, 230. The belt loops 220, 230 can slide between the stop 232 and the first friction buckle 210.

Figure 10D:
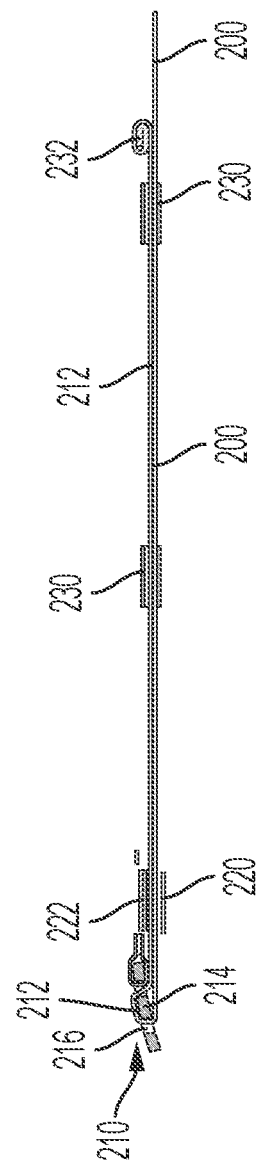
FIG. 10D shows a cross section in the direction of Arrows B-B of FIG. 10A.

Alternatively, as shown in FIG. 10D, the non-moveable stop 232 can be formed by the end of the second end 212 of the first belt 200 being folded into a roll which is sufficiently large so as to prevent it from passing through either of the two belt loops 230. In such a design, the second end 212 of the first belt 200 always extends through and is permanently held by the two belts loops 230 as the non-moveable stop is unable to be removed from the two belt loops. The belt loops 220, 230 can slide between the stop 232 and the first friction buckle 210. In such a design, the second end of the 212 of the first belt 200 cannot be removed from the friction buckle 210. Therefore, a part of the length of the second end 212 is merely slid in an out of the friction buckle 210, whilst a part always remains within the friction buckle 210 and the belt loops 220, 230, in order to release or tighten the friction buckle 210.

The construction of the second belt 202 is similar to the first belt 200. Where the same features are incorporated on the second belt 202 that are on the first, the same reference numbers have been used. The second belt 202 also comprises a second metal loop 204 attached to a first end 206 of the second belt 202, a second friction buckle 210 attached to a second end 212 with a lock strap 222 attached to the second friction buckle 210, a first belt loop 220 with a VELCRO© fastener, second and third belt loops 230 and a non-moveable stop 232 (whether the non-moveable stop is attached to the second belt between the second metal loop 204 and second friction buckle 210 or to the end of the second end 212). The construction and operation of the second metal loop 204, the second friction buckle 210, the second lock strap 222, the belt loops 220, 230 and the stop 232 are the same as those features associated with the first belt 200.

Figure 1B:
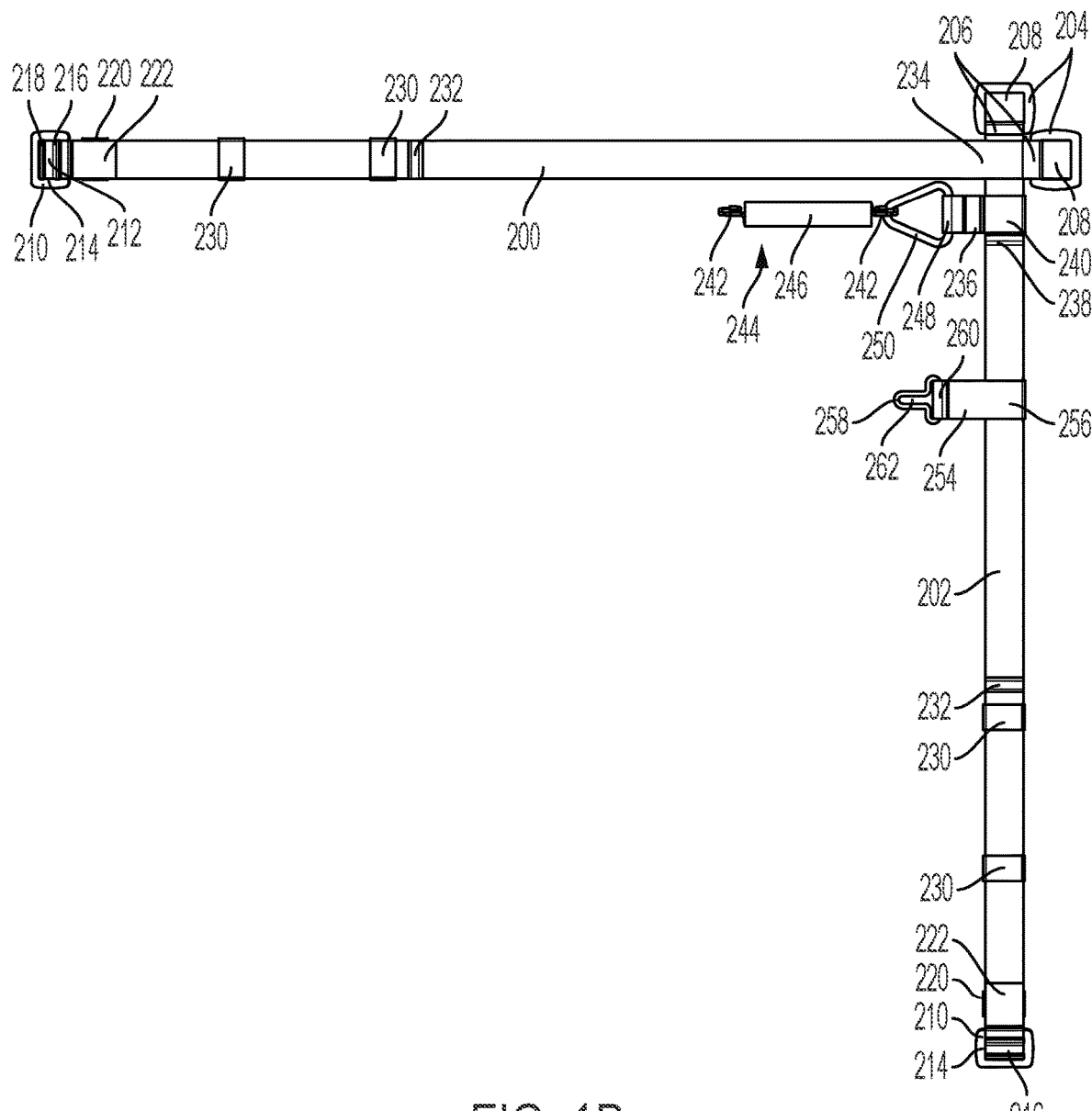
FIG. 1B shows a plan view of the first embodiment of the lanyard shown in FIG. 1A.
Figure 1C:
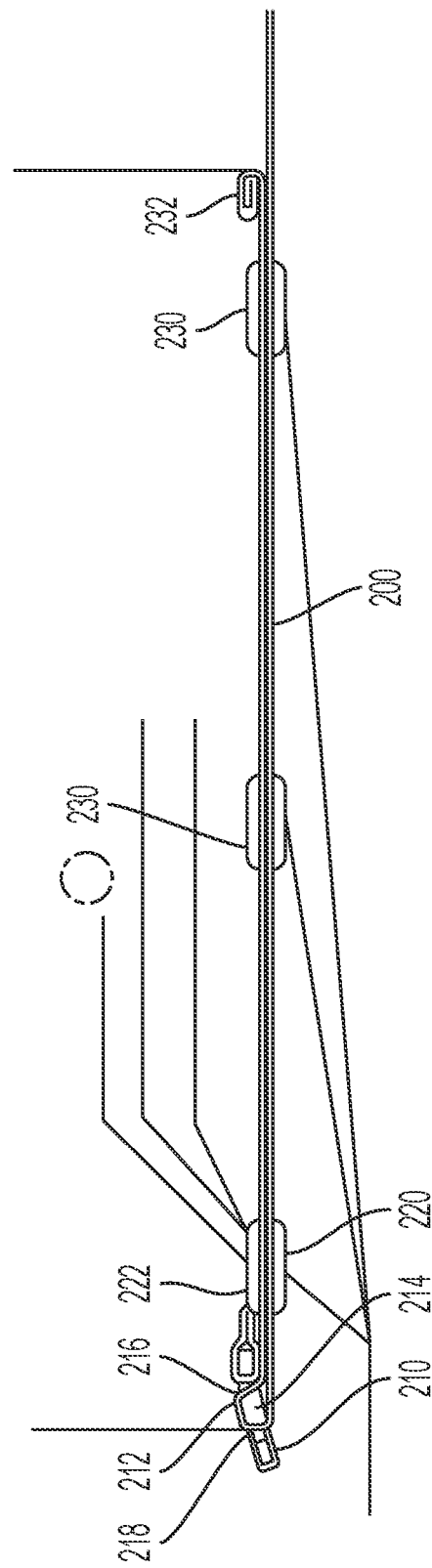
FIG. 1C shows a cross-sectional view in the direction of Arrows B-B in FIG. 1B.

The first end 206 of the first belt 200 is connected to the first end 206 of the second belt 224 at a junction 234 by being stitched in well-known manner. It will be appreciated that the two belts 200, 202 can be attached to each other using other methods, such as, gluing, welding or fusing, and/or rivets. The belts 200, 202 are attached to each other in manner so that, when the belts 200, 202 are extended in a straight direction, the plane of the first belt 200 is parallel to the plane of the second belt 202 and the first belt 200 extends perpendicularly to the second belt 202 as best seen in FIGS. 1A and 1B.

Attached to the second belt 202 adjacent the junction 234 is a spring strap 236. A second non-movable stop 238 is attached to the second belt 202 adjacent a first end 240 of the spring strap 236, trapping the spring strap 236 between the junction 234 and the stop 238 and preventing axial movement of the spring strap 236 along the second belt 202. The first end 240 of the spring strap 236 wraps around the second belt 202 and attaches to a part of the spring strap 236 adjacent the first end 240 by being stitched in well-known manner. It will be appreciated that the first end 240 can be attached to the part of the spring strap 236 adjacent the first end 240 by other methods, such as, gluing, welding or fusing, and/or rivets. The spring strap 236 can be freely rotated (Arrow A) around the second belt 202 so that it can extend radially in any direction. A circular connector 242 of a straight helical spring 244, comprising a central helical section 246 with two circular connectors 242 formed at each end, is connected to the second end 248 of the spring strap 236 via a carabiner 250. The other circular connector 242 is capable of connecting a lanyard rope (not shown) which in turn can be connected to the user or building or infrastructure. The carabiner 250 is attached to the second end 248 of the spring strap 236 by the second end 248 of the spring strap 236 wrapping around the carabiner 250 and attaching to a part of the spring strap 236 adjacent the second end 248 by being stitched in well-known manner. It will be appreciated that the second end 248 can be attached to the part of the spring strap 236 adjacent the second end 248 by other methods, such as, gluing, welding or fusing, and/or rivets Attached to the second belt between the stop 232 and the second non-moveable stop 238 is a hook strap 254. A first end 256 of the hook strap 254 wraps around the second belt 202 and attaches to a part of the hook strap 254 adjacent the first end 256 by being stitched in well-known manner. It will be appreciated that the first end 256 can be attached to the part of the hook strap 254 adjacent the first end 256 by other methods, such as, gluing, welding or fusing, and/or rivets. The hook strap 254 can be freely rotated (Arrow B) around the second belt 202 so that it can extend radially in any direction. The hook strap 254 can be freely slide to any axial position between the two stops 232, 238 on the second belt 202. A metal T shaped hook 258 is attached to a second end 260 of the hook strap 254. A T shaped aperture 262 is formed through the T shaped hook 258. The second end 260 of the hook strap passes through the top of the T shaped aperture and passes back on itself to attach to a part of the hook strap 254 adjacent the second end 260 by being stitched in well-known manner. It will be appreciated that the second end 260 can be attached to the part of the hook strap adjacent the second end by other methods, such as, gluing, welding or fusing, and/or rivets. The T shaped hook 258 is capable of attaching to a battery 106 of a power tool 100 when the lanyard is attached to a battery powered power tool.

Figure 6:
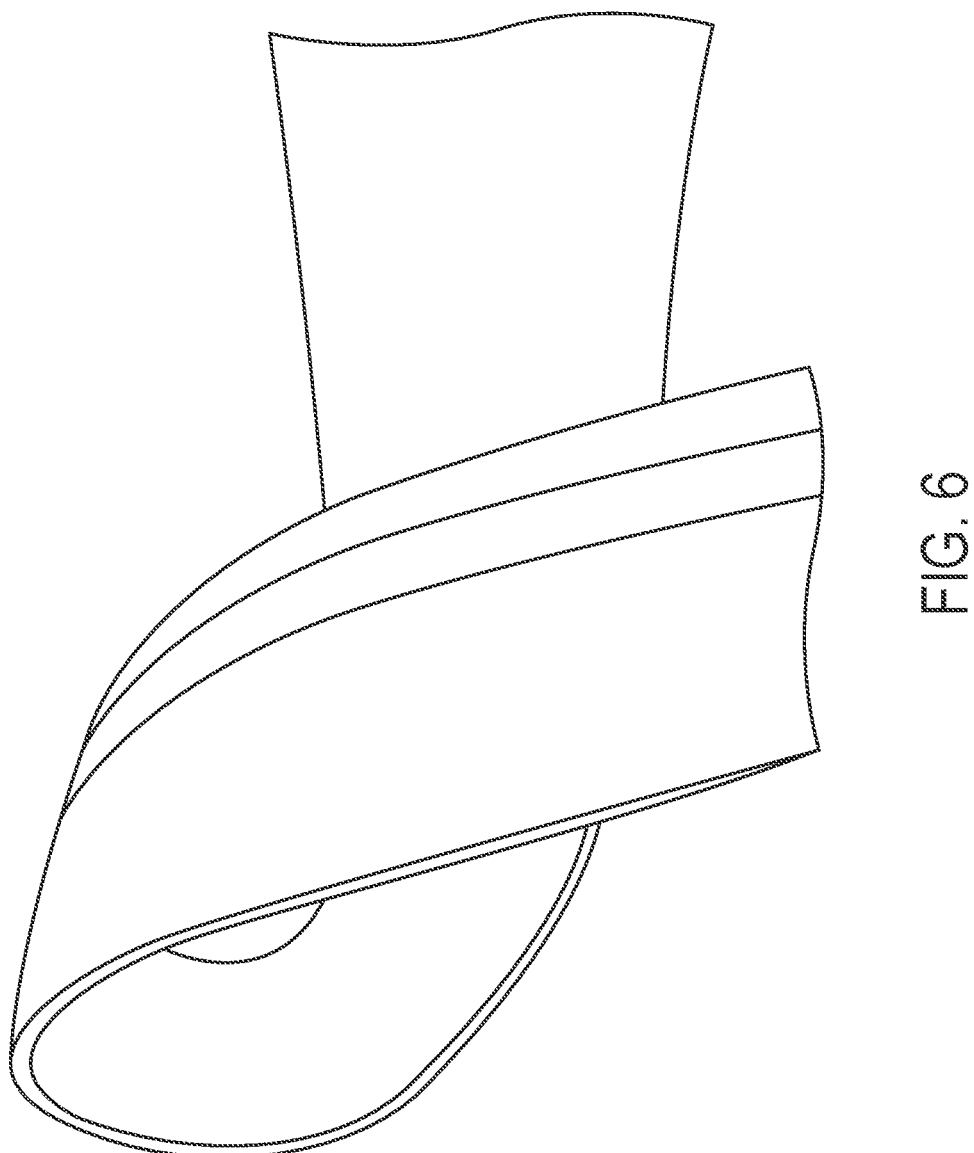
FIG. 6 shows a view of part of the strip of material which form the first belt of the lanyard shown in FIG. 1A.
Figure 7A:
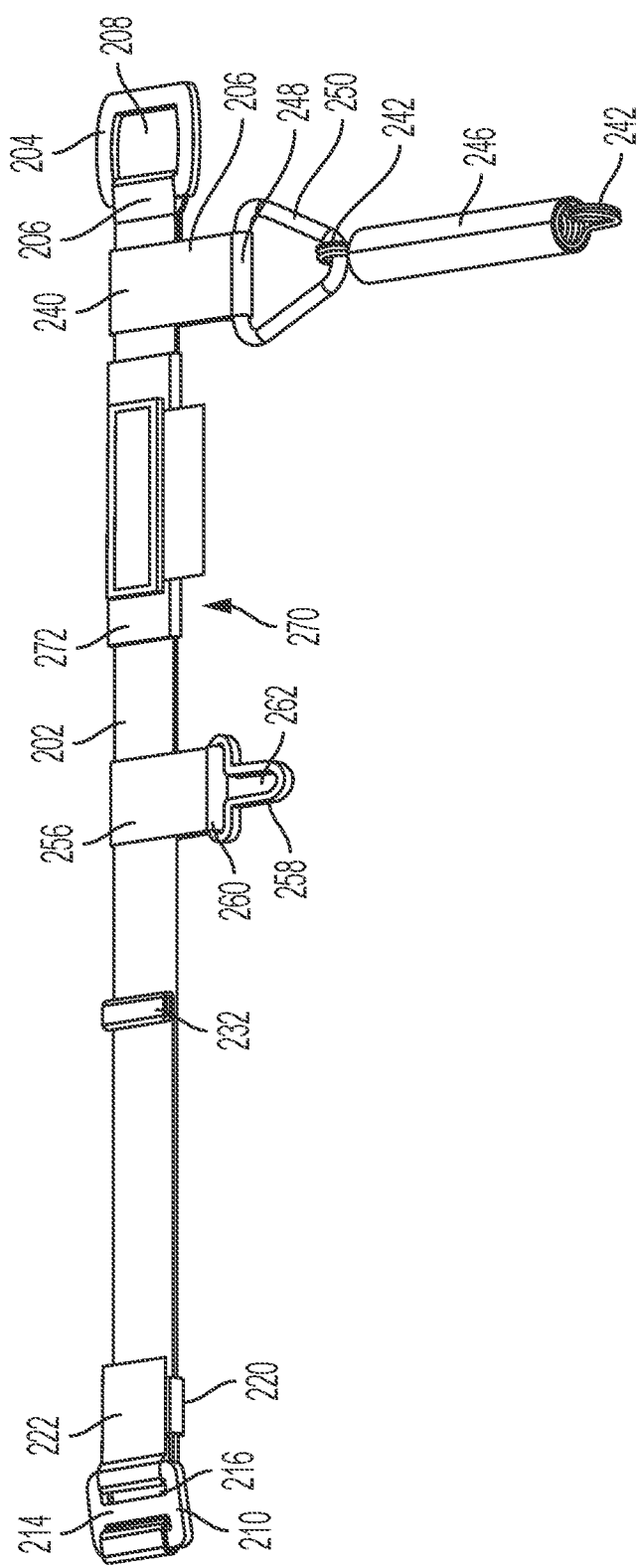
FIG. 7A shows a perspective view of a second embodiment of a lanyard according to the present invention.
Figure 7B:
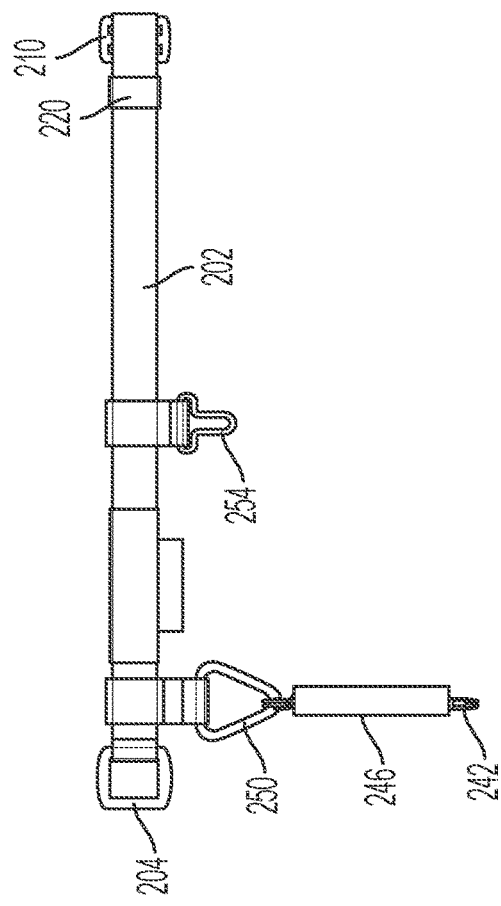
FIG. 7B shows a plan view from a first side of the second embodiment of the lanyard shown in FIG. 7A.
Figure 7C:
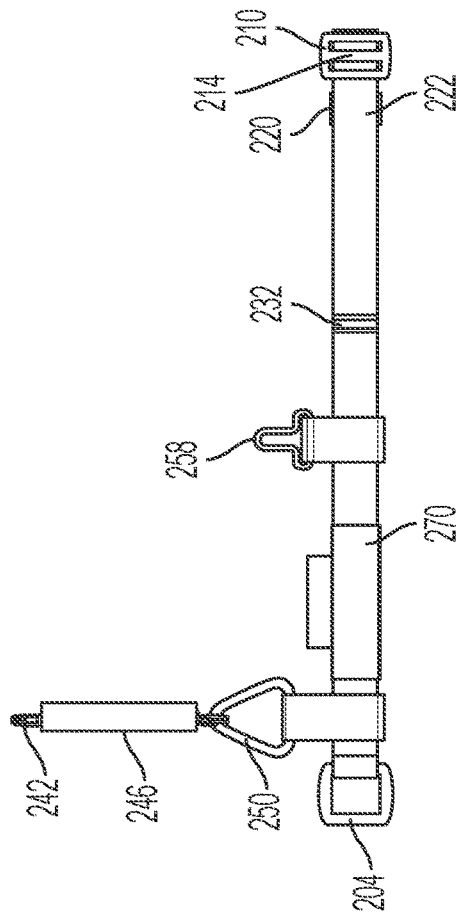
FIG. 7C shows a plan view from a second side of the second embodiment of the lanyard shown in FIG. 7A.

The first belt 200 is shown in FIG. 6. The first belt 200 is made from a black material 400 with a yellow stripe 402 which runs the length of the first belt 200 (shown schematically in part in FIG. 10A). The second belt 202 is made from a black material only. By adding a yellow strip to the first belt 200, the user can visually easily tell which strap is which and therefore which friction buckle 210 should attach to which metal loop 204. The colours of the first belt 200 have been chosen to reflect the colour scheme or livery of the DEWALT© brand. It will be appreciated the word DEWALT© (or other logo's) could also be incorporated into the belt 200.

Figure 2B:
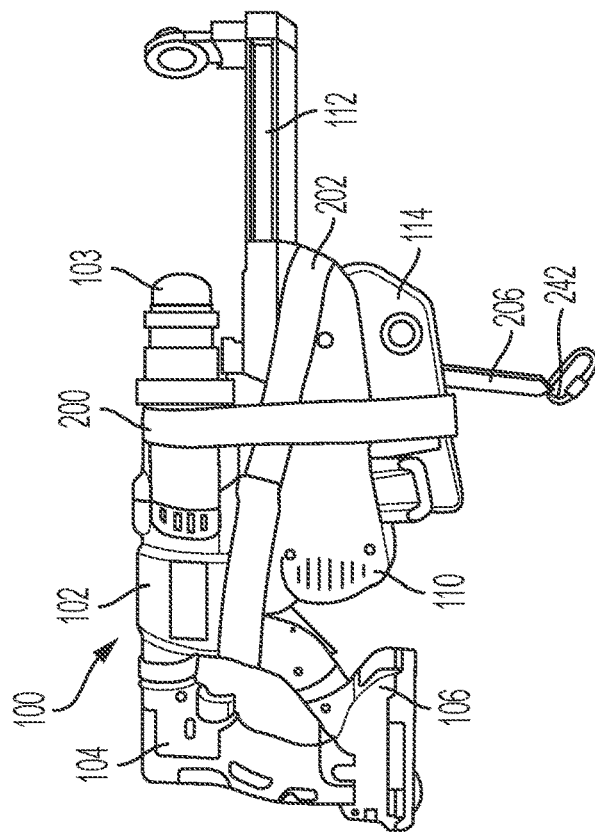
FIGS. 2A and 2B shows first and second sides of a combined DEWALT® DCH 133 hammer drill and dust extractor with the lanyard of FIG. 1 attached.
Figure 2A:
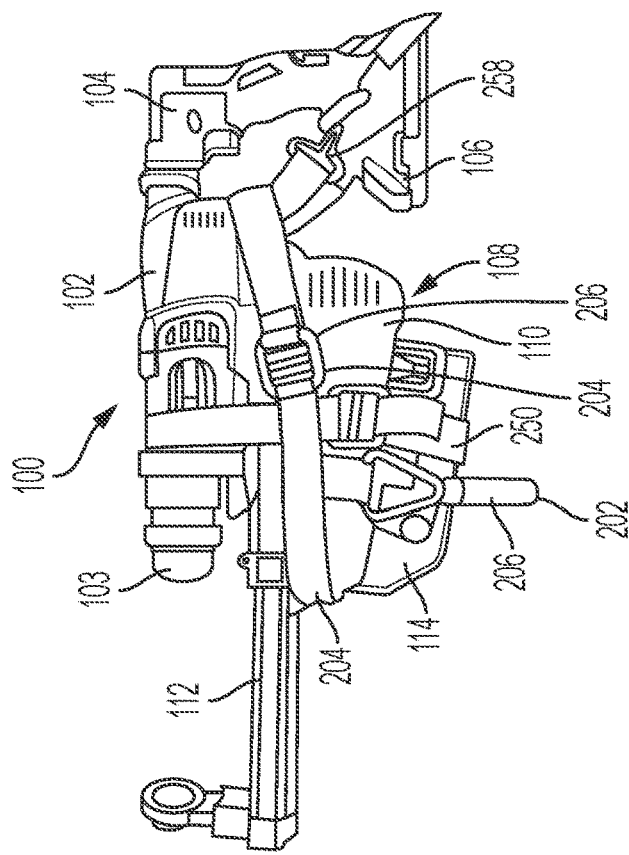
Figure 3B:
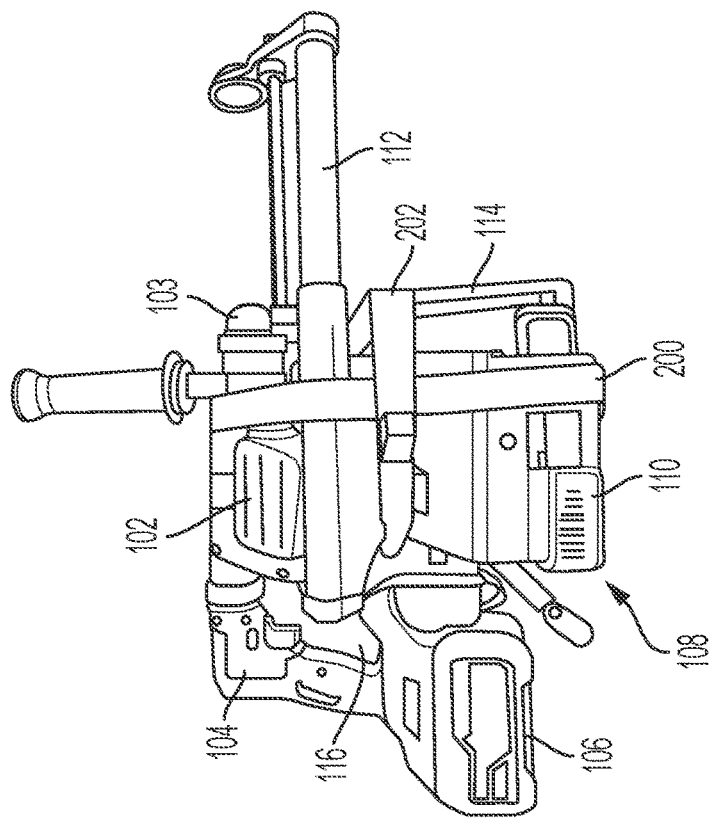
FIGS. 3A and 3B shows first and second sides of a combined DEWALT® DCH 323T2 hammer drill and dust extractor with the lanyard of FIG. 1 attached.
Figure 3A:
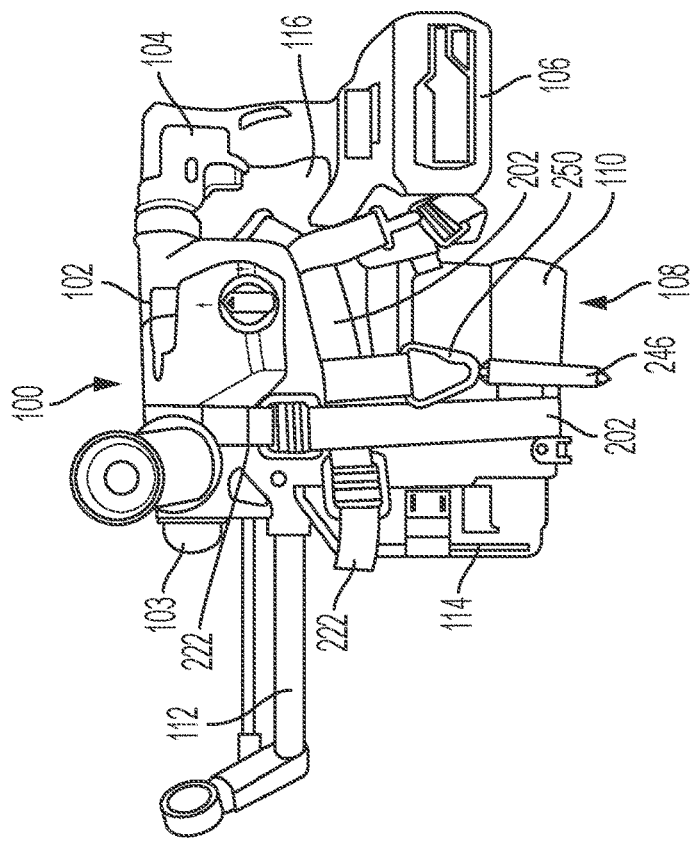
Figure 4A:
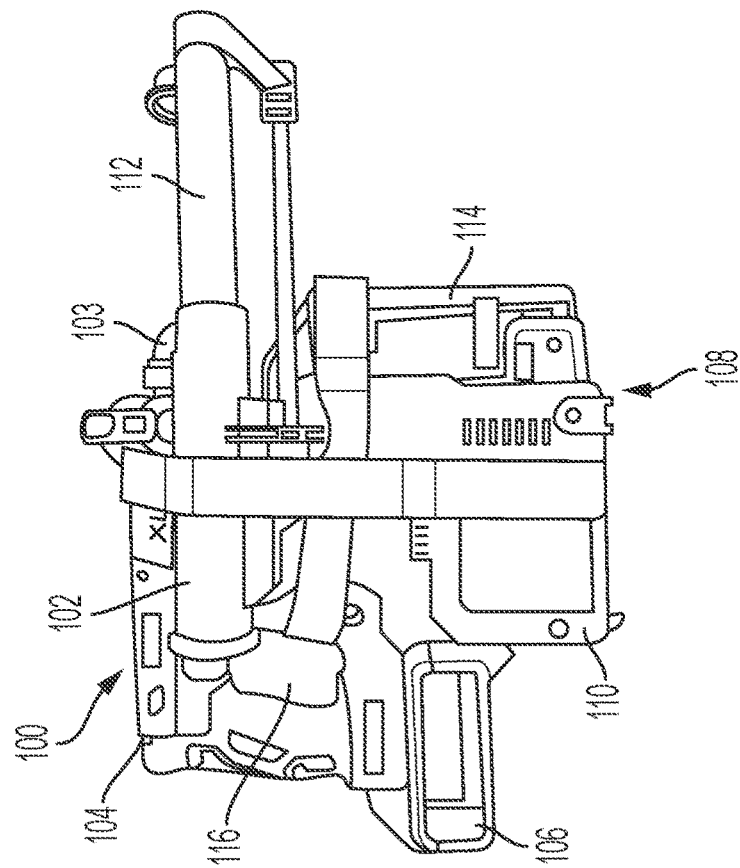
FIGS. 4A and 4B shows first and second sides of a combined DEWALT® DCH 273 hammer drill and dust extractor with the lanyard of FIG. 1 attached.
Figure 4B:
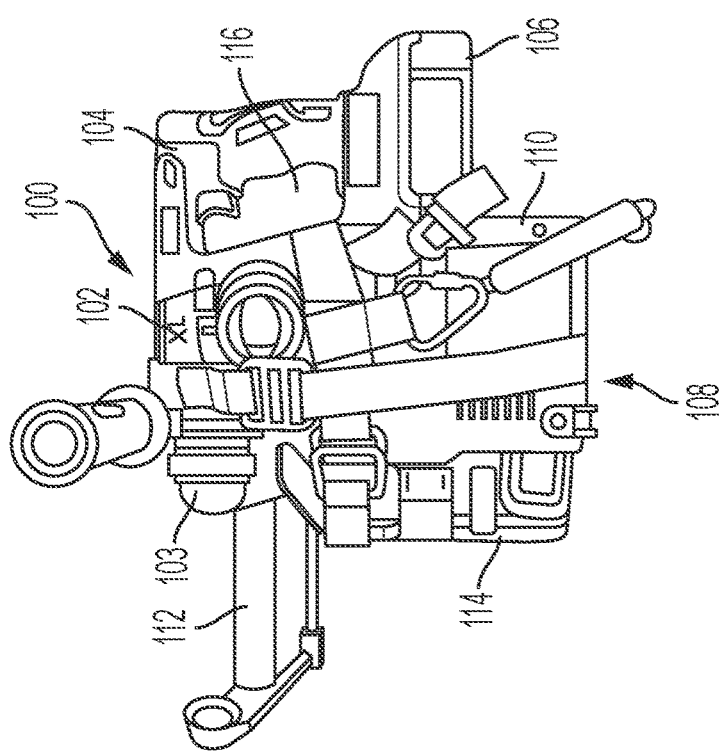
Figure 5A:
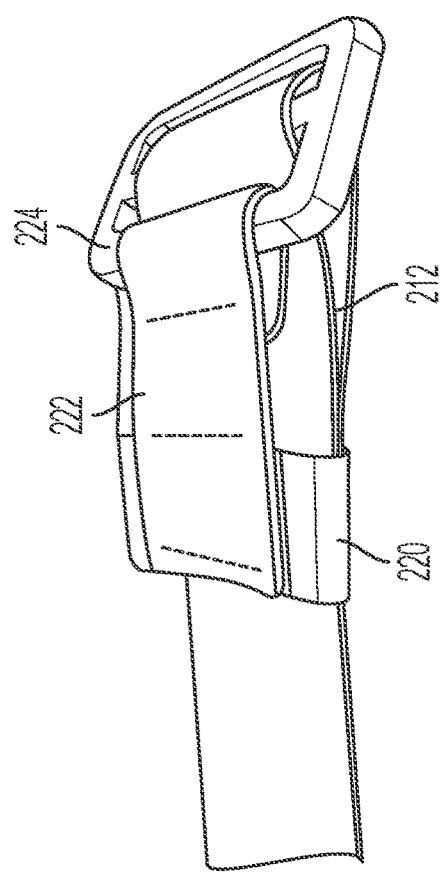
FIG. 5A shows a view of the second end of the first belt with a buckle attached and with the lock strap open.
Figure 5B:
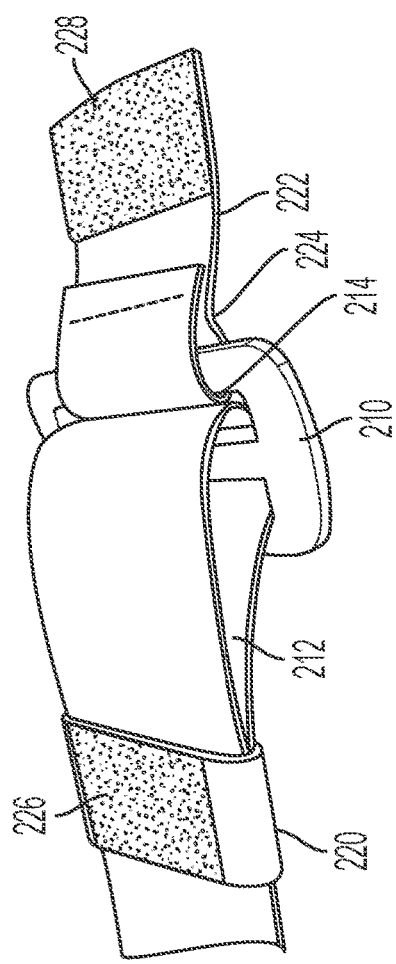
FIG. 5B shows a view of the second end of the first belt with a buckle attached and with the lock strap closed.

FIGS. 2A and 2B show the lanyard when mounted on a first design of hammer drill 100 with a dust extractor 108 attached. FIGS. 3A and 3B show the lanyard when mounted on a second design of hammer drill 100 with a dust extractor 108 attached. FIGS. 4A and 4B show the lanyard when mounted on a third design of hammer drill 100 with a dust extractor 108 attached. The same reference numbers in these Figures denote the same features on the different designs of hammer drills. The three different designs of hammer drills 100 are types of power tools and the dust extractors 108 and batteries 106 are auxiliary parts connected in a functional manner to the respective hammer drills, the dust collection boxes 114 being auxiliary parts connected in a functional manner to a respective dust extractor 108.

In use, the first belt 200 is wrapped vertically around the main body 102 of the hammer drill and the main housing 110 of the dust extractor 108. In FIGS. 2A and 2B, the first belt 200 also wraps around the dust collection box 114. The first friction buckle 210 is then connected to the first metal loop 204 and then the first belt 200 is tightened. Once fully tightened, the first lock strap 222 is attached to the belt loop 220 using the VELCRO© fastener. The second belt 202 extends horizontally and passes through the aperture 116 formed by the rear of the main body 102 and the rear handle 104, around the main body 102 of the hammer drill and/or main housing 110 of the dust extractor 108. In FIGS. 3A, 3B, 4A and 4B, the second belt 202 also wraps around the dust collection box 114. The second friction buckle 210 is then connected to the second metal loop 204 and then the second belt 202 is tightened. Once fully tightened, the second lock strap 222 is attached to the belt loop 220 using the VELCRO© fastener. The T shaped hook 258 is then attached to a clip of a battery 106. The free circular connector 242 is than attached to a cable (not shown) which in turn is attached to either the user or a building or infrastructure. In the event the user drops the hammer drill 100, the lanyard and cable prevent the hammer drill 100 from falling a large distance. The helical spring 244 stretches slightly when the cable is extended to its maximum amount to absorb the impact on the cable, the helical spring 244 acting as a dampener. The design of the lanyard is such that the dust extractor 108, the dust collection box 114 and/or battery 106 cannot fall separately. Furthermore, the lanyard maintains the dust extractor 108 connected to the hammer drill 100 in a functional manner and the dust collection box of 114 of each dust extractor in connection with the dust extractor 108 in a functional manner when the hammer drill 100, dust extractor 108 and dust collection box 114 are dropped because the lanyard wraps around the three and prevents relative movement between them.

The first embodiment discloses the use of a single lanyard comprising two belts 220, 202 to maintain the functional connection of the dust extractor 108 with the hammer drill 100 and the dust collection box 114 with the dust extractor when the hammer drill 100, dust extractor 108 and dust collection box 114 are dropped. It will be appreciated that two separate lanyards can be utilised to perform the same function. In a first arrangement, the first lanyard surrounds the hammer drill 100 and dust extractor 114. The second lanyard surrounds the dust extractor 108 and the dust collection box 114. The first lanyard can maintain the functional connection between the dust extractor 108 and the hammer drill 100 when the hammer drill 100, dust extractor and dust collection box 114 are dropped. The second lanyard can maintain the functional connection between the dust extractor 108 and the dust collection box 114 when the hammer drill 100, dust extractor and dust collection box 114 are dropped.

Alternatively, the two separate lanyards can be utilised to perform the same function in a second arrangement. The first lanyard surrounds the hammer drill 100 and dust extractor 114. The second lanyard surrounds the hammer drill 100 and the dust collection box 114. The first lanyard can maintain the functional connection between the dust extractor 108 and the hammer drill 100 when the hammer drill 100, dust extractor and dust collection box 114 are dropped. The second lanyard can maintain the functional connection between the dust extractor 108 and the dust collection box 114 when the hammer drill 100, dust extractor and dust collection box 114 are dropped.

It will also be appreciated that the first lanyard can surround the hammer drill 100 and dust collection box 114 and the second lanyard surrounds the dust extractor 108 and the dust collection box 114 to perform the same function.

A second embodiment of a lanyard according to the present invention will now be described with reference to FIGS. 7A to FIG. 9. The design is similar to that of the first embodiment. Where the same features in the second embodiment are present in the first embodiment, the same reference numbers have been used. It is also to be understood that the same features function in the same manner as in the first embodiment.

The second embodiment is the same except for two different design aspects.

Firstly, the second embodiment has only a single belt 202.

Secondly, the second embodiment comprises a sheaf 270 which surrounds the belt 202. The sheaf 270 comprises a first side 272 which locates against a first side 274 of the single belt 202 (see FIG. 9). The sheaf 270 comprises a second side 276 attached to one side of the first side 272 which locates against the second side 278 of the single belt 202. The sheaf 270 further comprises a third side 280 which is attached to a second side of the first side 272 and which locates against the second side 276 of the sheaf 270. A VELCRO© fastener is located between the second and third sides of the sheaf 270. The sheaf 270, when wrapped around the single belt 202, can freely slide along the single belt 202. The purpose of the sheaf 270 is to enclose any free end 212 of the single belt 202 (shown in dashed lines) and hold it against the rest of the belt 202. The DEWALT© logo (brand) is printed on the external side of the first side 272 of the sheaf 270. It will be appreciated that the colour scheme of the DEWALT© logo is in the livery of the DEWALT© brand.

Figure 8B:
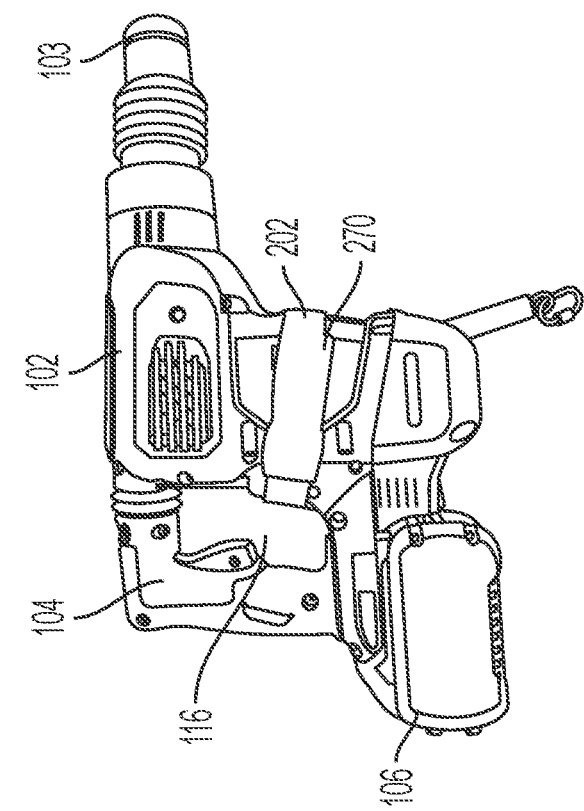
FIGS. 8A and 8B shows first and second sides of a DEWALT® L shaped SDS+/SDS MAX hammer drill with the lanyard of FIG. 7 attached.
Figure 8A:
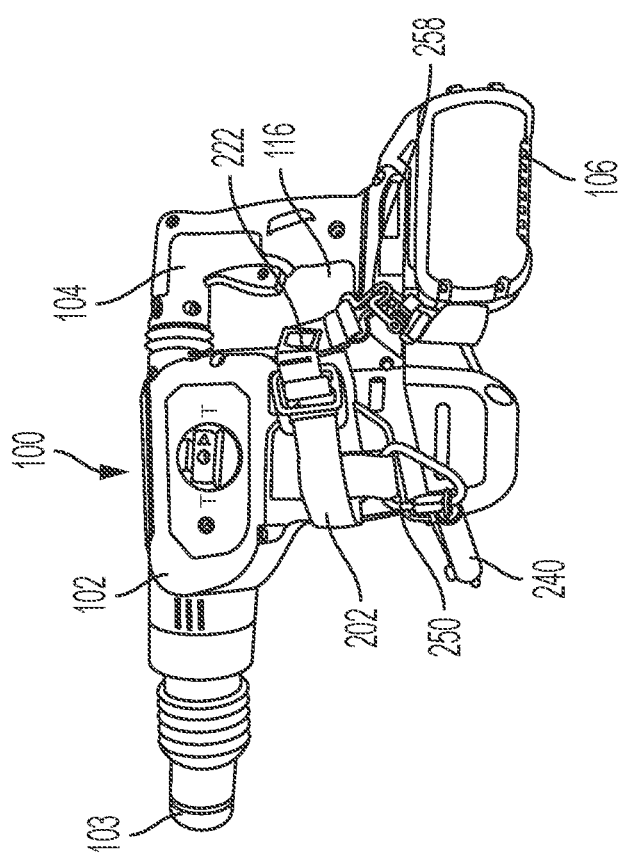
Figure 9:
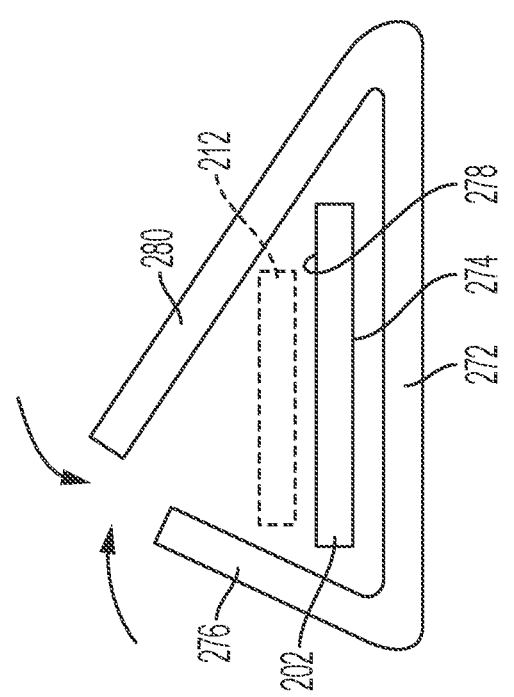
FIG. 9 shows a sketch of a cross section of the sheath.

In use as shown in FIGS. 8A and 8B, the single belt 202 extends horizontally and passes through the aperture 116 formed by the rear of the main body 102 and the rear handle 104, around the main body 102 of the hammer drill. The friction buckle is then connected to the metal loop and then the single belt is tightened. Once fully tightened, the lock strap 222 is attached to the belt loop 220 using the VELCRO© fastener. The T shaped hook 258 is then attached to a clip of a battery 106. The free circular connector 242 is than attached to a cable (not shown) which in turn is attached to either the operator or a building or infrastructure. In the event the user drops the hammer drill, the lanyard and cable prevent the hammer drill from falling a large distance. The helical spring 244 stretches slightly when the cable is extended to its maximum amount to absorb the impact on the cable, the helical spring 244 acting as a dampener. The design of the lanyard is such that the battery 106 cannot fall separately.

A third embodiment of a lanyard according to the present invention will now be described with reference to FIGS. 10A to FIG. 10C. The design is similar to that of the first embodiment. Where the same features in the third embodiment are present in the first embodiment, the same reference numbers have been used. It is also to be understood that the same features function in the same manner as in the first embodiment.

The third embodiment is the same as the first embodiment except for one feature. The spring strap 236 and straight helical spring 244 of the first embodiment have been replaced by a spring strap 310 and a U-shaped helical spring 312.

Referring to FIG. 10A, attached to the second belt 202 adjacent the junction 234 is the spring strap 310. The second non-movable stop 238 is attached to the second belt 202 adjacent a first end 314 of the spring strap 310, trapping the spring strap 310 between the junction 234 and the stop 238 and preventing axial movement of the spring strap 310 along the second belt 202. The first end 314 of the spring strap 310 wraps around the second belt 202 and attaches to a part of the spring strap 314 adjacent the first end 314 by being stitched in well-known manner. It will be appreciated that the first end 314 can be attached to the part of the spring strap 310 adjacent the first end 314 by other methods, such as, gluing, welding or fusing, and/or rivets. The spring strap 310 can be freely rotated (Arrow A) around the second belt 202 so that it can extend radially in any direction. A shaft 316 of a metal bolt 326 is attached to a second end 318 of the spring strap 310 by the second end 318 of the spring strap 310 wrapping around the shaft 316 and attaching to a part of the spring strap 310 adjacent the second end 318 by being stitched in well-known manner. It will be appreciated that the second end 318 can be attached to the part of the spring strap 310 adjacent the second end 318 by other methods, such as, gluing, welding or fusing, and/or rivets. Two circular connectors 320 of a U-shaped helical spring 312, comprising a two straight parallel leg sections 322 interconnected by a central curved helical section 324 with the two circular connectors 320 formed at each end of each leg section 322 remote from the central curved section 324, are connected to the ends of the shaft 316, one connector 320 being sandwiched between the head 328 of the bolt 326 and side of the end 318 of the spring strap 310, the other connector 320 being sandwiched between a nut 330 screwed onto the end of the shaft 316 of the bolt 326 and the side of the end 318 of the spring strap 310. A cover 340 surrounds the U-shaped spring 312. The U-shaped spring 312 is capable of being connected via a carabiner to a lanyard rope (not shown) which in turn can be connected to the user or building or infrastructure.

The diameter of the two straight parallel helical leg sections 322 and the central curved helical section 324 of the U-shaped spring 312 is uniform over the whole length of the U-shaped helical spring 312. Different diameter U-shaped springs can be used to support hammer drills held by the lanyard of different weights when dropped, the larger the diameter, the greater the weight it can support. The size of the diameter can be utilised by the user as a visual aid in order to determine what weight of hammer can be used with the lanyard.

Carabiners typically have a pivotal lever which, when moved to an open position, provide a maximum sized gap to allow items such as the U-shaped spring 312 to enter into the carabiner in order to be locked into the carabiner by moving the pivotal lever into a closed position. Different sized carabiners have different sized maximum gap, the larger the carabiner, the larger the maximum gap. Therefore, if the U-shaped spring 312 is connected via a carabiner to a lanyard rope, a suitable size of the diameter of the U-Shaped spring 312 can be chosen to ensure that an appropriate size of carabiner has to be used to ensure that the correct carabiner is used with the appropriate U-shaped spring which is a visual aid to assist the user to choose the correct U-shaped spring 312 and carabiner for the weight of the hammer drill being used in the lanyard.

Figure 11A:
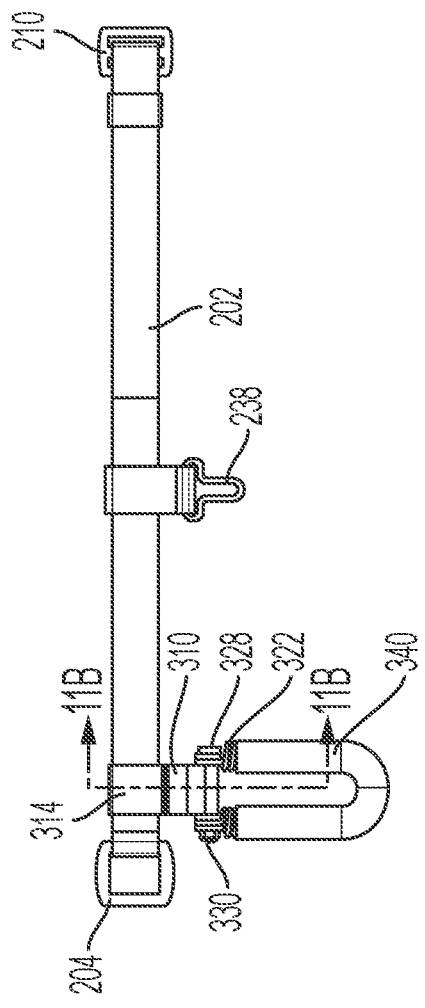
FIG. 11A shows a fourth embodiment of the present invention.
Figure 11C:
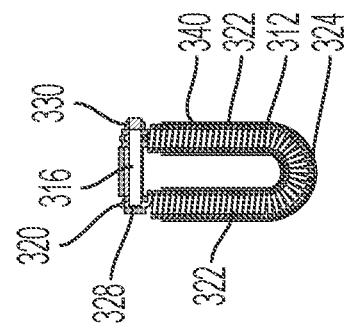
FIG. 11C shows a cross section in the direction of Arrows G-G IN FIG. 11B. Corresponding reference numerals indicate corresponding parts throughout the several views of the drawings.
Figure 11B:
FIG. 11B shows a side view of the U-shaped spring shown in FIG. 11A.

A fourth embodiment of a lanyard according to the present invention will now be described with reference to FIG. 11. The design is similar to that of the second embodiment. Where the same features in the fourth embodiment are present in the second embodiment, the same reference numbers have been used. It is also to be understood that the same features function in the same manner as in the second embodiment.

The fourth embodiment is the same as the second embodiment except for one feature. The spring strap 236 and straight helical spring 244 of the second embodiment have been replaced in the fourth embodiment by a spring strap 310 and a U-shaped helical spring 312 which is the same as that used in the third embodiment.

Whilst the embodiments described above relate to lanyards which are used with hammer drills, it will be appreciated that lanyards in accordance with the present invention can used on other types of power tools. DEWALT® is a registered trademark of The Black & Decker Corporation. VELCRO© is a registered trademark of Velcro BVBA.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool system comprising:
a power tool including a main body and a battery receiving portion configured to removably receive a battery pack;
an auxiliary element other than the battery pack releasably connected to the power tool at a location other than the battery receiving portion and configured to perform an operation that is complementary to an operation of the power tool; and
a lanyard mountable on the main body of the power tool and the auxiliary element, the lanyard comprising at least two belts including a first belt and a second belt attached to each other at a single junction, wherein the two belts are configured to securely hold the auxiliary element against the main body of the power tool along two directions.

2. The power tool system of claim 1, wherein a first end of the first belt is attached to a first end of the second belt.

3. The power tool system of claim 1, wherein, when the at least two belts are extended in a straight direction, a plane of the first belt is parallel to a plane of the second belt.

4. The power tool system of claim 1, wherein, when the at least two belts are extended in a straight direction, the first belt extends in a direction that is perpendicular to the second belt.

5. The power tool system of claim 1, wherein a first part of the first belt is capable of being attached to a second part of the first belt and/or a first part of the second belt is capable of being attached to a second part of the second belt.

6. The power tool system of claim 5, wherein the first part of the first belt is attachable to the second part of the first belt using a first connector and the first part of the second belt is attachable to the second part of the second belt using a second connector.

7. A power tool system comprising:
a power tool including a main body and a battery receiving portion configured to removably receive a battery pack;
an auxiliary element other than the battery pack releasably connected to the power tool at a location other than the battery receiving portion and configured to perform an operation that is complementary to an operation of the power tool; and
a lanyard mountable on the main body of the power tool and the auxiliary element, the lanyard comprising:
a belt arranged to be mounted around the main body of the power tool and the auxiliary element;
a strap including a first end mounted on the belt and configured to be rotatable around a longitudinal axis of the belt, and a second end; and
an accessory attached to the second end of the strap.

8. The power tool system of claim 7, wherein the strap is axially slidable along the belt.

9. The power tool system of claim 7, wherein the accessory comprises a hook for attachment to a battery pack couplable to the power tool.

10. The power tool system of claim 9, wherein the hook comprises a T-shaped hook attachable to a clip of the battery pack.

11. The power tool system of claim 7, wherein the accessory comprises a spring coupled to the strap.

12. The power tool system of claim 11, wherein the accessory further includes a carabiner coupled to the spring, wherein the carabiner is arranged to be fixedly coupled to a building or an infrastructure via a rope.

13. The power tool system of claim 11, wherein the accessory further includes a connector coupled to the spring, wherein the connector is arranged to be fixedly coupled to a building or an infrastructure via a rope.

14. The power tool system of claim 11, wherein the spring is at least one of a U-shaped spring, a linear spring, or a helical spring.

\* \* \* \* \*